(12) United States Patent
Martin

(10) Patent No.: US 7,025,509 B2
(45) Date of Patent: Apr. 11, 2006

(54) CABLE SLEEVE AND METHOD OF INSTALLATION

(75) Inventor: Eric Martin, Ottawa (CA)

(73) Assignee: Dafacom Solutions, Inc., (CA)

( * ) Notice: Subject to any disclaimer, the term of this patent is extended or adjusted under 35 U.S.C. 154(b) by 0 days.

(21) Appl. No.: 11/059,040

(22) Filed: Feb. 16, 2005

(65) Prior Publication Data
US 2005/0265668 A1    Dec. 1, 2005

(30) Foreign Application Priority Data
Feb. 16, 2004  (CA) .................................. 2457815

(51) Int. Cl.
G02B 6/36    (2006.01)
G02B 6/44    (2006.01)

(52) U.S. Cl. .................. 385/86; 385/134; 385/113

(58) Field of Classification Search ................ 385/99, 385/113, 134–139
See application file for complete search history.

(56) References Cited

U.S. PATENT DOCUMENTS

| | | | | |
|---|---|---|---|---|
| 3,296,047 A | * | 1/1967 | Russell | 156/86 |
| 4,510,348 A | * | 4/1985 | Arroyo et al. | 174/121 A |
| 4,929,478 A | * | 5/1990 | Conaghan et al. | 428/35.1 |
| 4,944,685 A | * | 7/1990 | Schulte | 439/135 |
| 4,946,722 A | * | 8/1990 | Moyer | 428/36.1 |
| 5,214,243 A | * | 5/1993 | Johnson | 174/36 |
| 5,403,977 A | * | 4/1995 | Steptoe et al. | 174/77 R |
| 5,923,802 A | * | 7/1999 | Giebel et al. | 385/76 |

* cited by examiner

*Primary Examiner*—Michelle R. Connelly-Cushwa
*Assistant Examiner*—Chris Chu
(74) *Attorney, Agent, or Firm*—Buckingham Doolittle & Burroughs, LLP; Louis F. Wagner, Esq.

(57) ABSTRACT

The invention provides a bend/stress relief sleeve kit for installation over an existing fibre optic cable/fibre optic cable connector assembly without disassembly or modification of the existing fibre optic cable/fibre optic cable connector assembly, the kit comprising: an inner spiral wrap for wrapping the existing fibre optic cable/fibre optic cable connector assembly, overlapping at least part of the fibre optic cable connector and extending over the fibre optic cable, the spiral wrap providing bend relief; an outer mesh having a tubular passageway, for overlapping at least part of the fibre optic cable connector and extending over the fibre optic cable, the outer mesh covering at least a substantial portion of the inner spiral wrap; first fastening means for fastening the outer mesh to the fibre optic cable connector; and second fastening means for fastening the outer mesh to the fibre optic cable; whereby the combination of the outer mesh, the first fastening means and the second fastening means provides tensile strength to the existing fibre optic cable/fibre optic cable connector assembly; and whereby the outer mesh provides a smooth exterior surface to prevent snagging with outside obstructions.

19 Claims, 10 Drawing Sheets

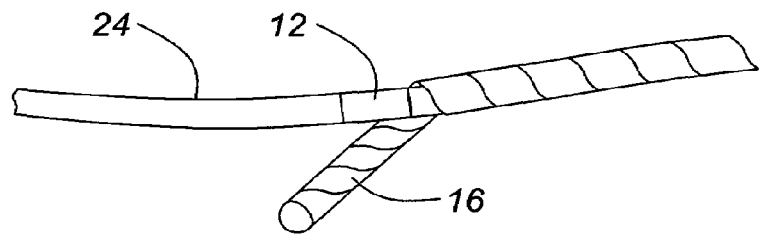
FIG. 7A
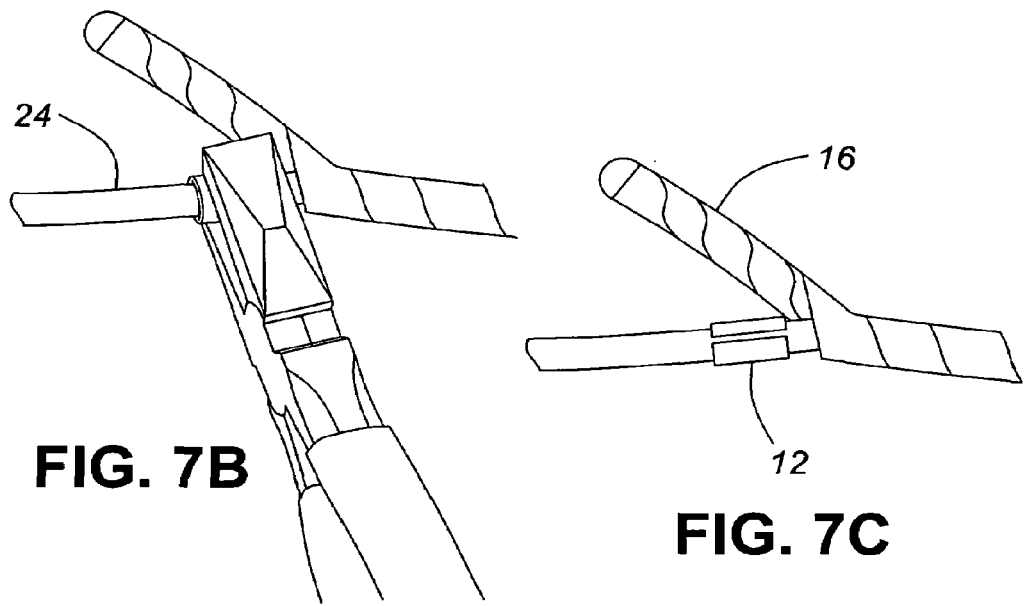
FIG. 7B
FIG. 7C
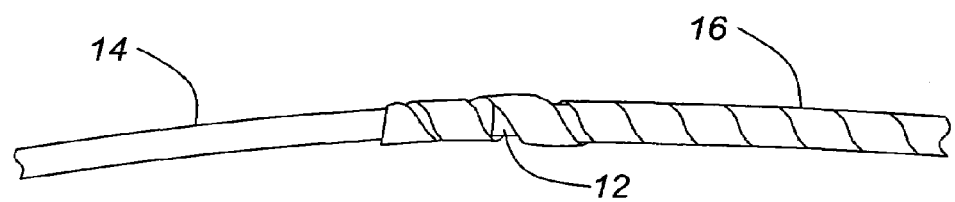
FIG. 8

CABLE SLEEVE AND METHOD OF INSTALLATION

FIELD OF INVENTION

The present invention relates to fibre optic connectors and more particularly to bend reliefs for fibre optic connectors and methods of installing such bend reliefs.

BACKGROUND OF THE INVENTION

The widespread use of fibre optic communications systems in a demanding field environment such as the modern-day battlefield requires rugged and re-deployable design and construction. Currently, harsh environment connectors and robust lightweight cables are used with some degree of success.

Military grade fibre cables are quite rugged in construction. A great deal of engineering has gone into making the cables resistant to impact, crush, and tensile forces. However, these cables, much like all optical cables, are sensitive to sharp bends, many breakages occurring at the connector-to-cable junction. These breakages occur because the weight to cable diameter ratio of the connector is quite large.

A second problem occurs upon the retrieval of the cables. Connectors, due to their large size and heavy weight, often become entangled or snagged on and around ground obstructions resulting in the breakage of the fibre at the connector-to-cable junction.

There is therefore a need for an improved connector and/or cable sleeve and method of installation, provided with consideration for the problems outlined above.

SUMMARY OF THE INVENTION

The present invention relates to fibre optic connectors and more particularly to bend reliefs for fibre optic connectors and methods of installing such bend reliefs.

It is an object of the invention to provide an improved fibre optic connector and/or cable sleeve.

According to the present invention there is provided a bend/stress relief sleeve kit for installation over an existing fibre optic cable/fibre optic cable connector assembly without disassembly or modification of the existing fibre optic cable/fibre optic cable connector assembly, the kit comprising: an inner spiral wrap for wrapping the existing fibre optic cable/fibre optic cable connector assembly, overlapping at least part of the fibre optic cable connector and extending over the fibre optic cable, the spiral wrap providing bend relief; an outer mesh having a tubular passageway, for overlapping at least part of the fibre optic cable connector and extending over the fibre optic cable, the outer mesh covering at least a substantial portion of the inner spiral wrap; first fastening means for fastening the outer mesh to the fibre optic cable connector; and second fastening means for fastening the outer mesh to the fibre optic cable; whereby the combination of the outer mesh, the first fastening means and the second fastening means provides tensile strength to the existing fibre optic cable/fibre optic cable connector assembly; and whereby the outer mesh provides a smooth exterior surface to prevent snagging with outside obstructions.

In another embodiment of the invention there is provided a method of installing a bend/stress relief sleeve over an existing fibre optic cable/fibre optic cable connector assembly, without modifying or disassembling the existing fibre optic cable/fibre optic cable connector assembly, comprising the steps of: wrapping a length of an inner spiral wrap around the existing fibre optic cable/fibre optic cable connector assembly, overlapping at least part of the fibre optic cable connector and extending over the fibre optic cable, the spiral wrap providing bend relief; inserting the wrapped existing fibre optic cable/fibre optic cable connector assembly into an outer mesh having a tubular passageway, overlapping at least part of the fibre optic cable connector and extending over the fibre optic cable, the outer mesh covering at least a substantial portion of the inner spiral wrap; fastening the outer mesh to the fibre optic cable connector using a first fastening means; and fastening the outer mesh to the fibre optic cable using a second fastening means; whereby the combination of the outer mesh, the first fastening means and the second fastening means provides tensile strength to the existing fibre optic cable/fibre optic cable connector assembly; and whereby the outer mesh provides a smooth exterior surface to prevent snagging with outside obstructions.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 6A presents an enlarged view of a fibre optic cable/fibre optic cable connector assembly showing the overlap of the inner spiral wrap on the fibre optic cable connector, while

FIG. 7A presents a detailed view of the placement of a small split crimp on the fibre optic cable, while FIG. 7B presents a view of the crimping of the small split crimp and FIG. 7C presents a view of the finished crimp, in an embodiment of the present invention;

FIG. 8 presents a detailed view of the completed wrapping of the inner spiral wrap over the small split crimp, in an embodiment of the present invention;

FIG. 9A presents a detailed view of the wrapping of an outer spiral wrap at the fibre optic connector, while

FIG. 10A presents a detailed view of the wrapped fibre optic cable/fibre optic cable connector assembly inserted into a length of webbing or mesh, while

FIG. 11A presents a view of the large split crimp being crimped to the fibre optic cable, while

FIG. 12A presents a detailed view of the mesh or webbing, pulled over the fibre optic connector, while

DETAILED DESCRIPTION

Figure 1:
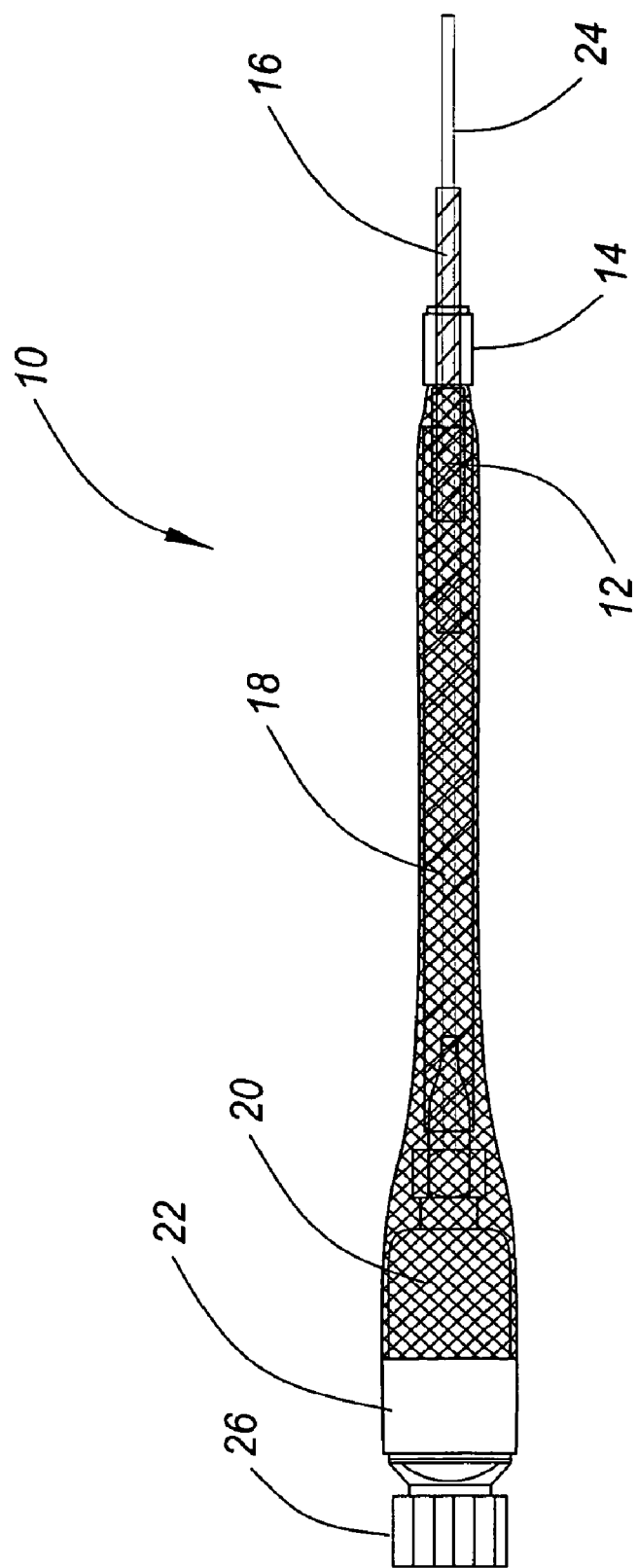
FIG. 1 presents a side cross-sectional view of a bend/stress sleeve installed on a fibre optic cable/fibre optic cable connector assembly, in an embodiment of the present invention.
Figure 2:
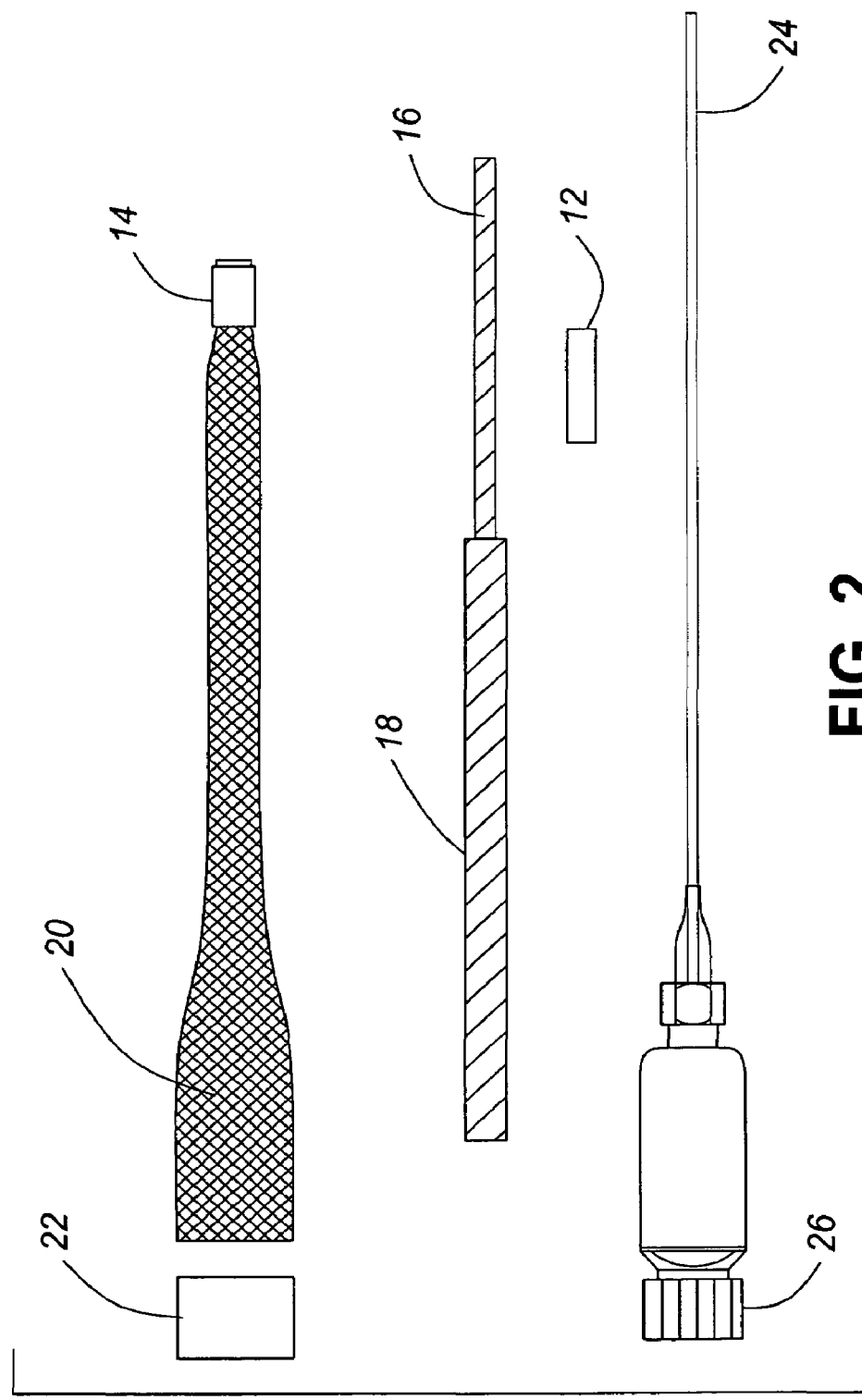
FIG. 2 presents a disassambled side elevation of a bend/stress sleeve kit, in an embodiment of the present invention.
Figure 3:
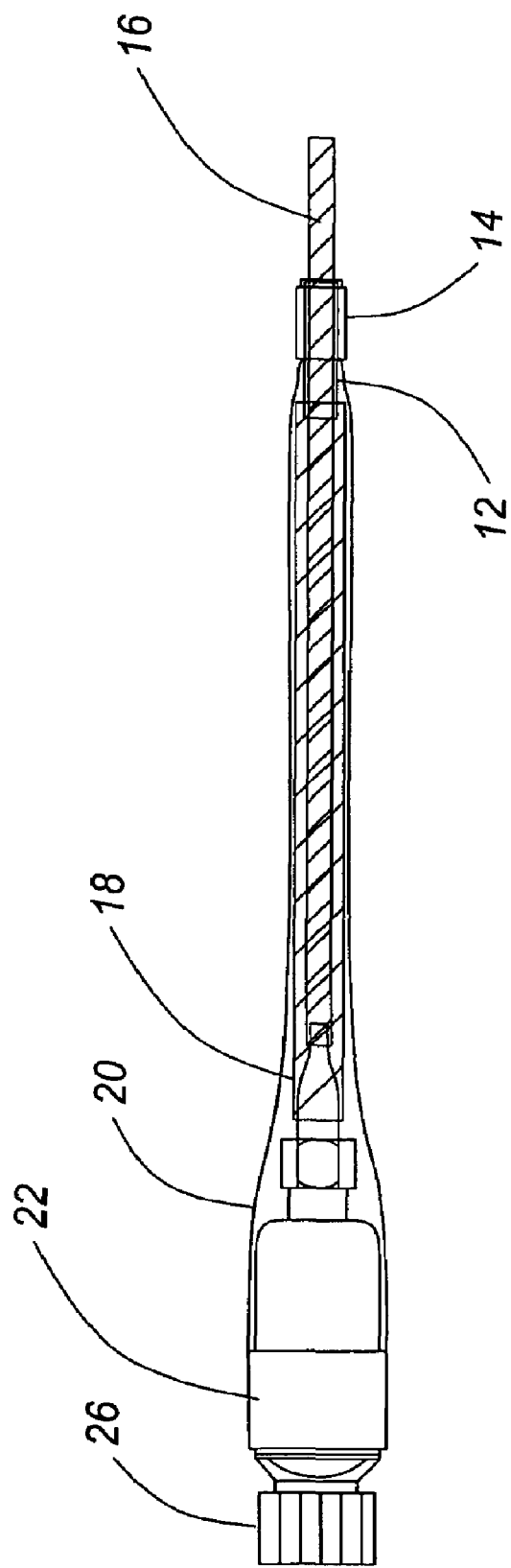
FIG. 3 presents a side cross-sectional view of a bend/stress sleeve installed on a fibre optic cable/fibre optic cable connector assembly, showing dimensions of the components, in an embodiment of the present invention.
Figure 4:
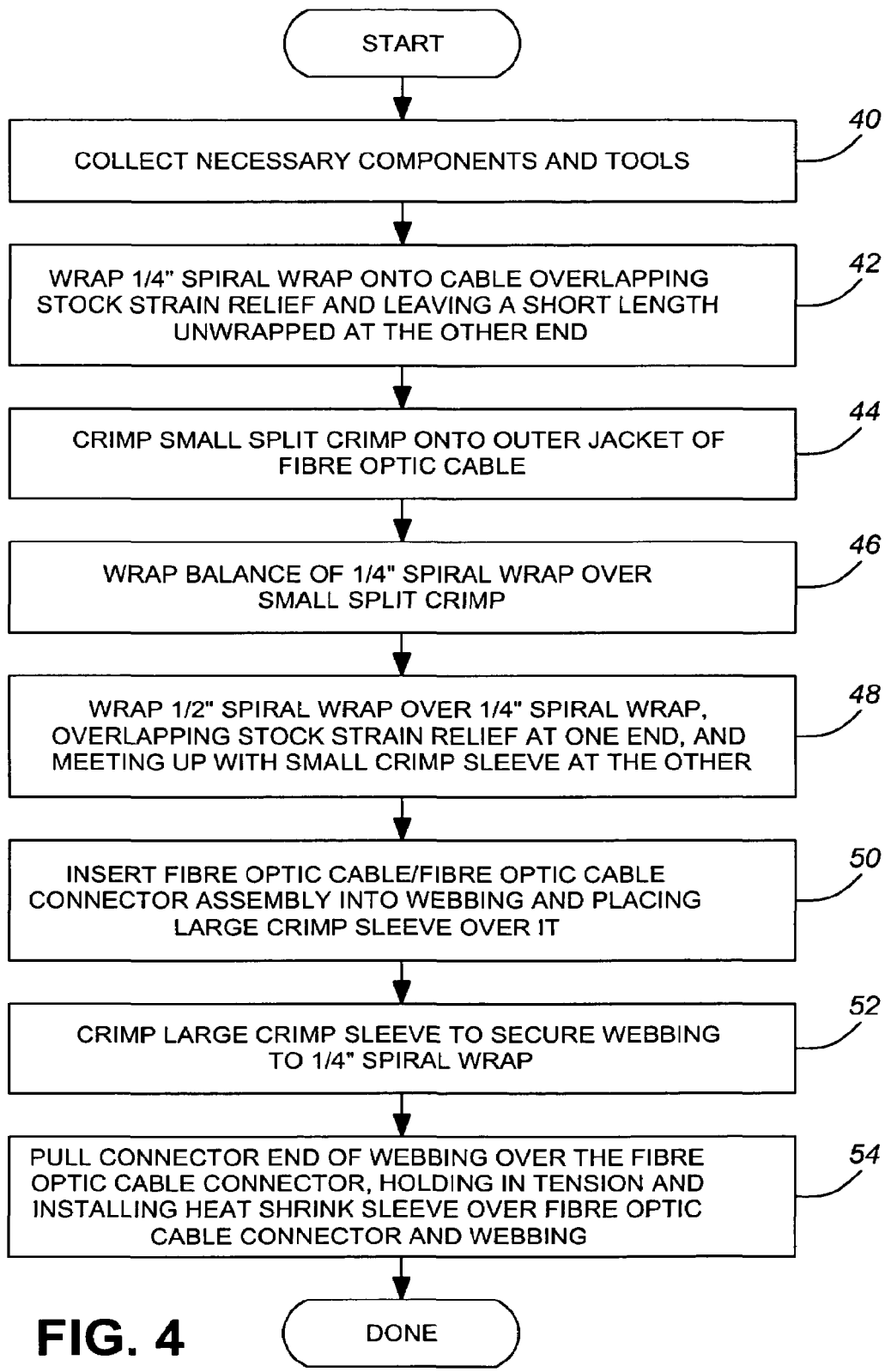
FIG. 4 presents a flow chart of a method of installing a bend/stress sleeve kit on a fibre optic cable/fibre optic cable connector assembly, in an embodiment of the present invention.

The bend/stress relief sleeve of the invention addresses the problems in the art. FIGS. 1, 2 and 3 present various side-elevation views and cross-sections of the invention. FIG. 4 presents a flow chart of a method of installation, while FIGS. 5 through 13 present perspective and detailed views of the bend/stress relief sleeve as it is being installed on an existing fibre optic cable/fibre optic cable connector assembly. The bend/stress relief of the invention can be installed on an existing cable/connector assembly without having to disassemble the cable/connector assembly. In addition to providing bend relief, the invention mechanically joins the fibre optic connector or Electro-Optical (E/O) module to the cable, thereby providing stress relief.

The bend/stress relief sleeve 10 of FIGS. 1, 2 and 3 uses a combination of:

two soft non-sparking metal split crimp sleeves 12, 14 that will hold their shapes when crimped and can be crimped with simple hand tools;

UV resistant polyethylene spiral wrap 16, 18 that will maintain flexibility in low temperatures such as Alpha SW-41 and SW-43;

abrasive-resistant polyester mesh sleeving 20 such as Alpha GRP 110¾; and a locking collar 22 made of high shrink ratio polyolefin tubing such as Alpha FIT-621-1-¼to provide bend radius control and mechanical strength to the cable 24.

Other similar materials may also be used for any of these components, as known in the art. For example, any suitable mesh or webbing material could be used in place of the abrasive-resistant polyester mesh sleeving 20, as dictated by the particular application. However, non-metallic polymers such as polyester and fiberglass are generally preferred.

As noted above, FIG. 1 presents a side cross-sectional view of the bend/stress sleeve installed on a fibre optic cable/fibre optic cable connector assembly. FIG. 2 presents a disassembled side elevation of the same bend/stress sleeve arrangement. This is relevant as the invention will typically be made available in a kit form, suitable for field installation. FIG. 3 presents the same bend/stress sleeve arrangement with exemplary dimensions shown.

The split inner crimp sleeve 12 is fixed to the outer sheath of the fibre optic cable 24 and provides an anchor point for the inner spiral wrap material 16, fiberglass mesh 20 and split outer crimp sleeve 14. The inner spiral wrap material 16 is used to augment the outer cable diameter and to provide continued bend relief past the split outer crimp sleeve 14.

The outer spiral wrap material 18 is of the same material as the inner spiral wrap 16, but is of larger diameter and provides the ultimate bend radius control. The fibreglass mesh material 20 is joined to the split inner crimp sleeve and inner spiral wrap material with the split outer crimp sleeve 14. The fibreglass mesh material 20 is then stretched and affixed to the connector or EO (electro-optical) module body 26 with the thermal activated locking collar 22.

Once installed, the bend/stress relief sleeve extends tensile strength of the cable through to the connector 26 and an effective radius control mechanism is achieved through the augmentation of the overall cable outer diameter.

As noted above, FIG. 4 presents a flow chart of a method of installation, while FIGS. 5 through 14 present perspective views of the bend/stress relief sleeve as it is being assembled.

Figure 5:
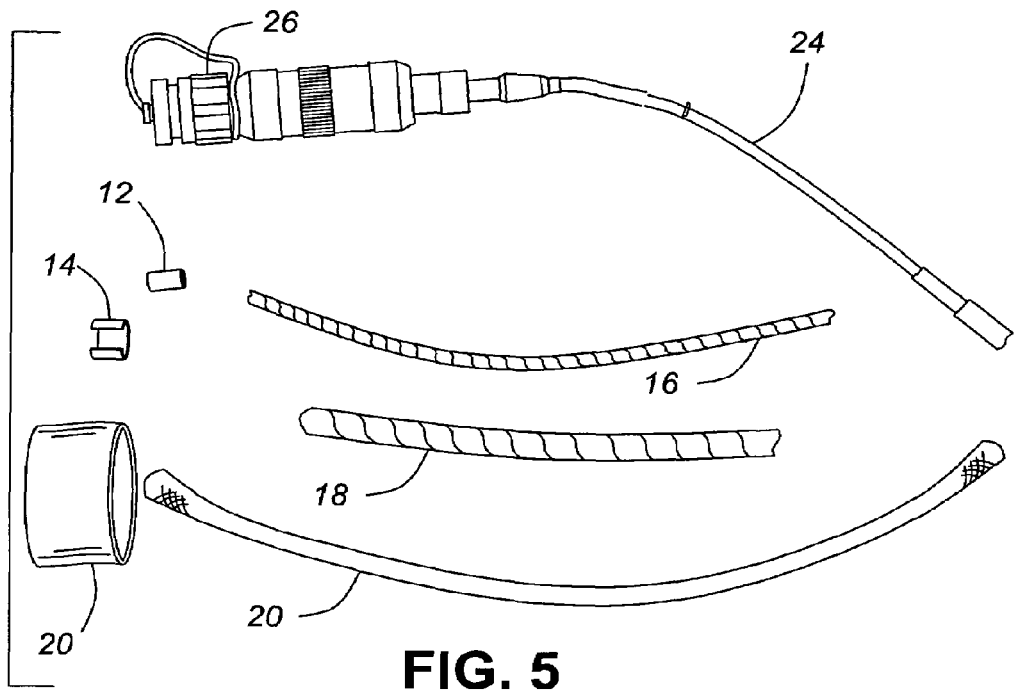
FIG. 5 presents a perspective view of a fibre optic cable/fibre optic cable connector assembly and components of a bend/stress sleeve kit, in an embodiment of the present invention.

The assembly process begins by collecting the necessary components and tools at step 40, as shown in FIG. 5. The standard kit consists of the following materials:

a. 1—webbing 13½" in length;
b. 1—½" spiral wrap 7¼" in length;
c. 1—¼" spiral wrap 9¼" in length;
d. 1—small split crimp;
e. 1—large split crimp; and
f. 1—1.5" high shrink ratio sleeve.

No special preparation of the connector/fibre optic cable assembly is necessary before installation begins because no adhesives, tapes, glues or cements are required. Prior systems which rely on such adhesives, tapes, glues or cements typically require that the fibre optic cable and connector be cleaned with a solvent and/or be treated with a compound of some sort to allow proper bonding. While the system of the invention does not require such treatment, it is preferable that the fibre optic cable/fibre optic cable connector assembly be clean and dry prior to assembly.

Figure 6A:
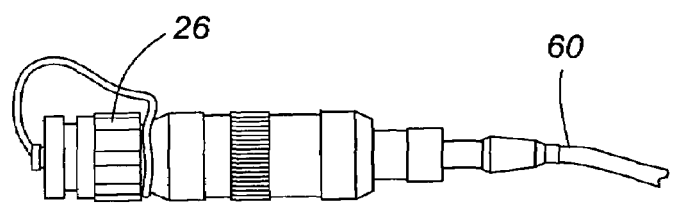
Figure 6B:
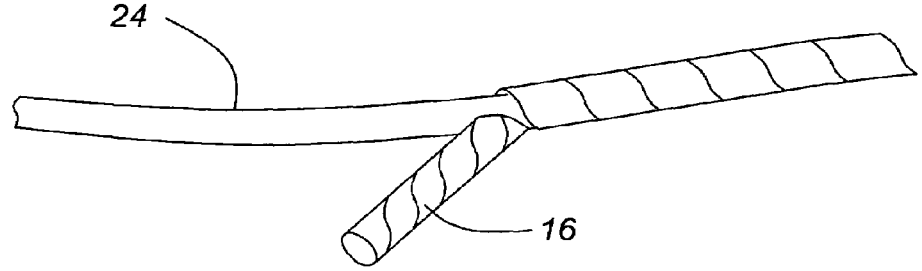
FIG. 6B presents a detailed view of the inner spiral wrap at the cable end of the installation, in an embodiment of the present invention.

At step 42, the ¼" spiral wrap is wrapped onto the fibre optic cable so that it overlaps the stock strain relief (which is a part of the fibre optic connector) by about ½". This overlap is clear at point 60 of FIG. 6A. Approximately 1" of the ¼" spiral wrap is left unwrapped at the other end of the assembly as shown in FIG. 6B. This extra length of ¼" spiral wrap will be completed at step 46 below.

The small split crimp 12 is then crimped onto the outer jacket of the fibre optic cable 24 at step 44, as shown in FIG. 7A. The small split crimp 12 may be tightly crimped using standard 8" linesman pliers, a dedicated crimping tool, or some similar tool. The crimping procedure is shown in FIG. 7B, while the finished crimp is shown in FIG. 7C.

At step 46, the balance of the ¼" spiral wrap is wrapped over the closed small split crimp 12 as shown in FIG. 8.

Figure 9A:
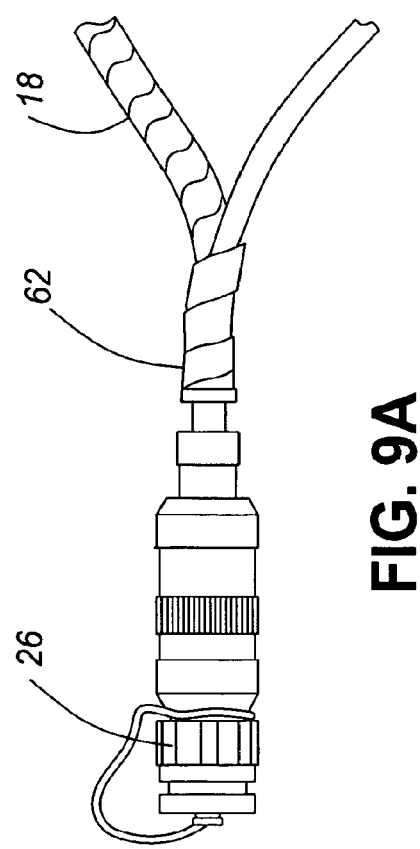
Figure 9B:
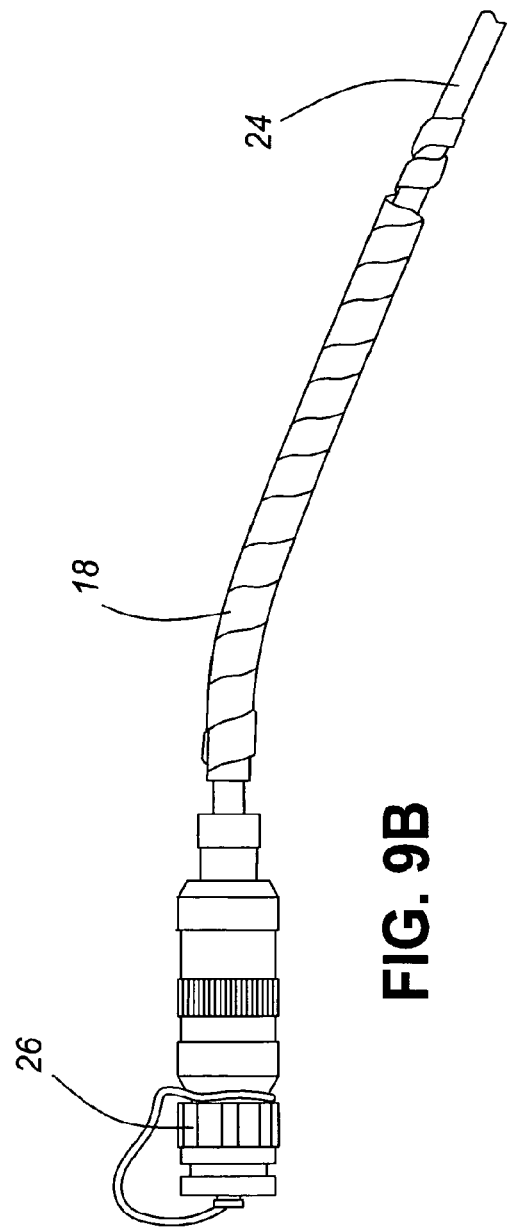
FIG. 9B presents a view of the completed wrapping of the outer spiral wrap, in an embodiment of the present invention.

As shown in FIG. 9A, the ½" spiral wrap 18 can then be wrapped over the ¼" spiral wrap at step 48, overlapping the stock strain relief by 1" or up to the edge of the stock strain relief (see point 62 in FIG. 9A). The ½" spiral wrap 18 can be wrapped completely over the ¼ spiral wrap 16, meeting up with the small crimp sleeve 12 at the end of the ¼" spiral wrap 16 as shown in FIG. 9B.

Figure 10A:
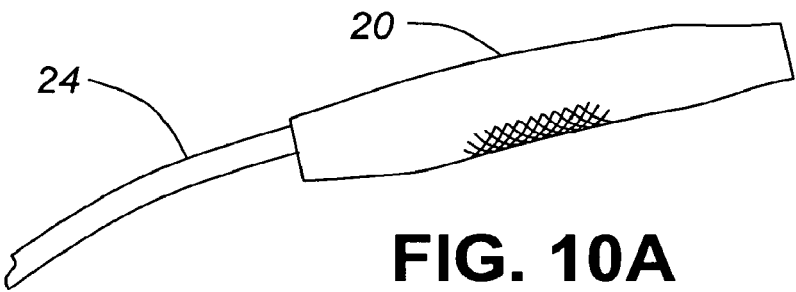
Figure 10B:
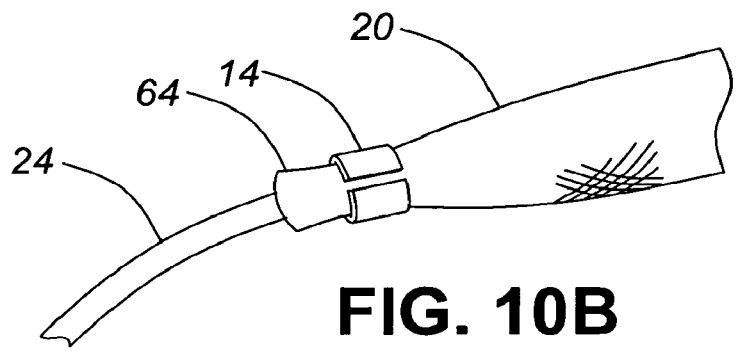
FIG. 10B presents a view of the positioning of a large split crimp over the webbing or mesh, in an embodiment of the present invention.

At step 50, the fibre optic cable/fibre optic cable connector assembly, now wrapped with two layers of spiral wrap 16, 18, can be inserted into the webbing as shown in FIG. 10A. The large crimp sleeve 14 is installed on the fibre optic cable 24 on the side of the small crimp sleeve 12 that is away from the fibre optic connector 26. It is butted up against the small crimp sleeve 12 to provide relief against pulling the fibre cable 24 out of the fibre optic connector 26. Note that the webbing 20 will need to be folded in order to fit in the large crimp sleeve 14 (i.e. the webbing 20 has a much larger diameter than the large crimp sleeve 14). The webbing 20 should protrude by about ½" past the large crimp sleeve 14 as shown in FIG. 10B (see point 64).

Figure 11A:
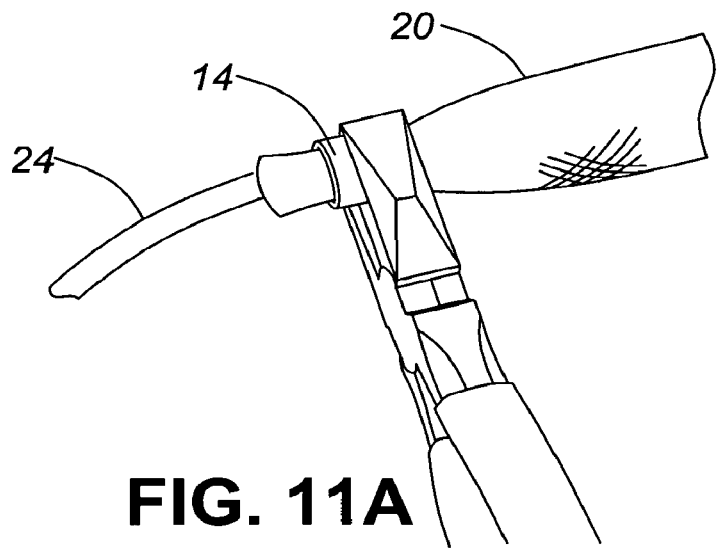
Figure 11B:
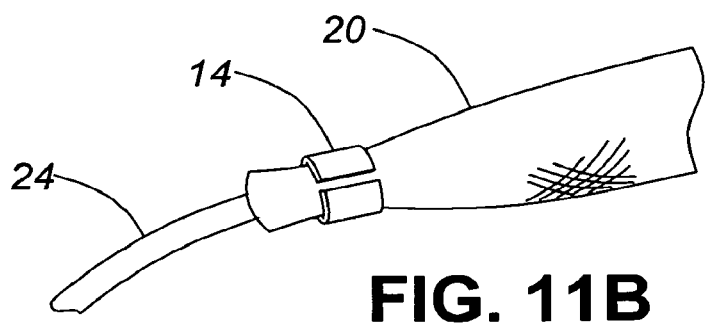
FIG. 11B presents a view of the finished crimp, in an embodiment of the present invention.

Using standard 8" linesman pliers or a similar tool, the large crimp sleeve 14 may now be crimped at step 52, as shown in FIG. 11A, to secure the webbing 20 to the ¼ spiral wrap 16. The compressed crimp is shown in FIG. 11B.

Figure 12A:
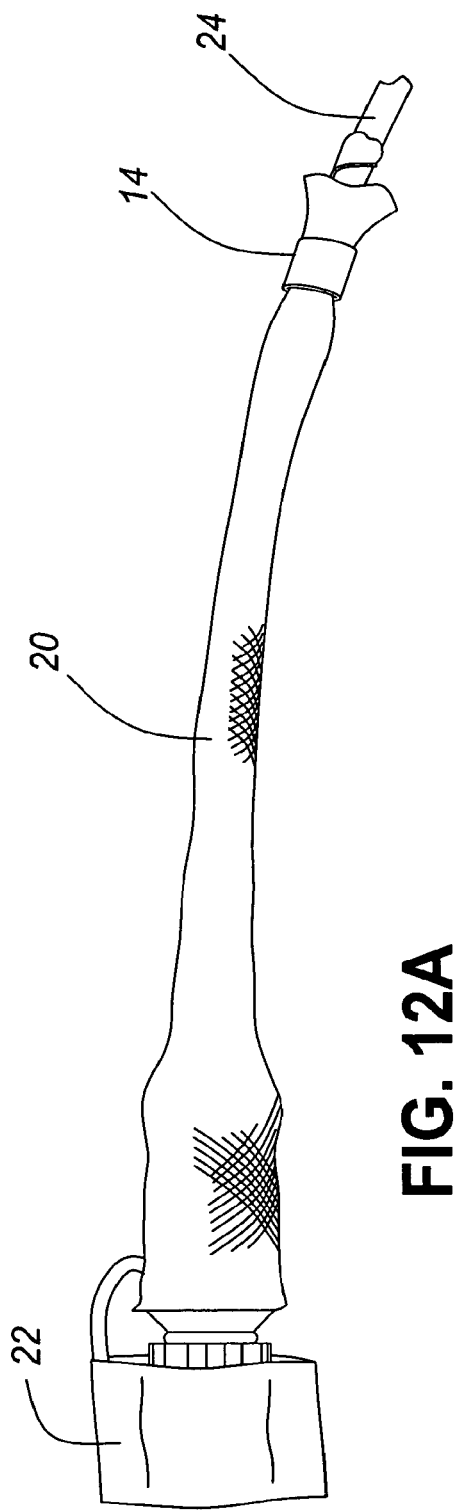
Figure 12B:
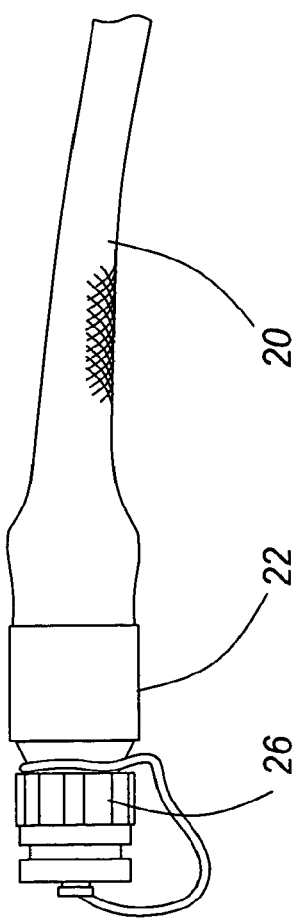
FIG. 12B presents a view of the fibre optic connector with a heat shrink sleeve in place over the mesh or webbing, in an embodiment of the present invention.

The connector end of the webbing 20 is now pulled up over the fibre optic cable connector 26 (or EO Module) at step 54 and held in tension. The webbing 20 should slightly overlap the fibre optic cable connector 26 as shown in FIG. 12A. The heat shrink sleeve 22 is then installed over the fibre optic cable connector 26 and webbing 20, slightly overlapping the body as well. Heat is then applied to shrink the heat shrink sleeve 22 and secure the assembly. Note that care should be taken not to overheat the webbing 20 as it can melt.

Figure 13:
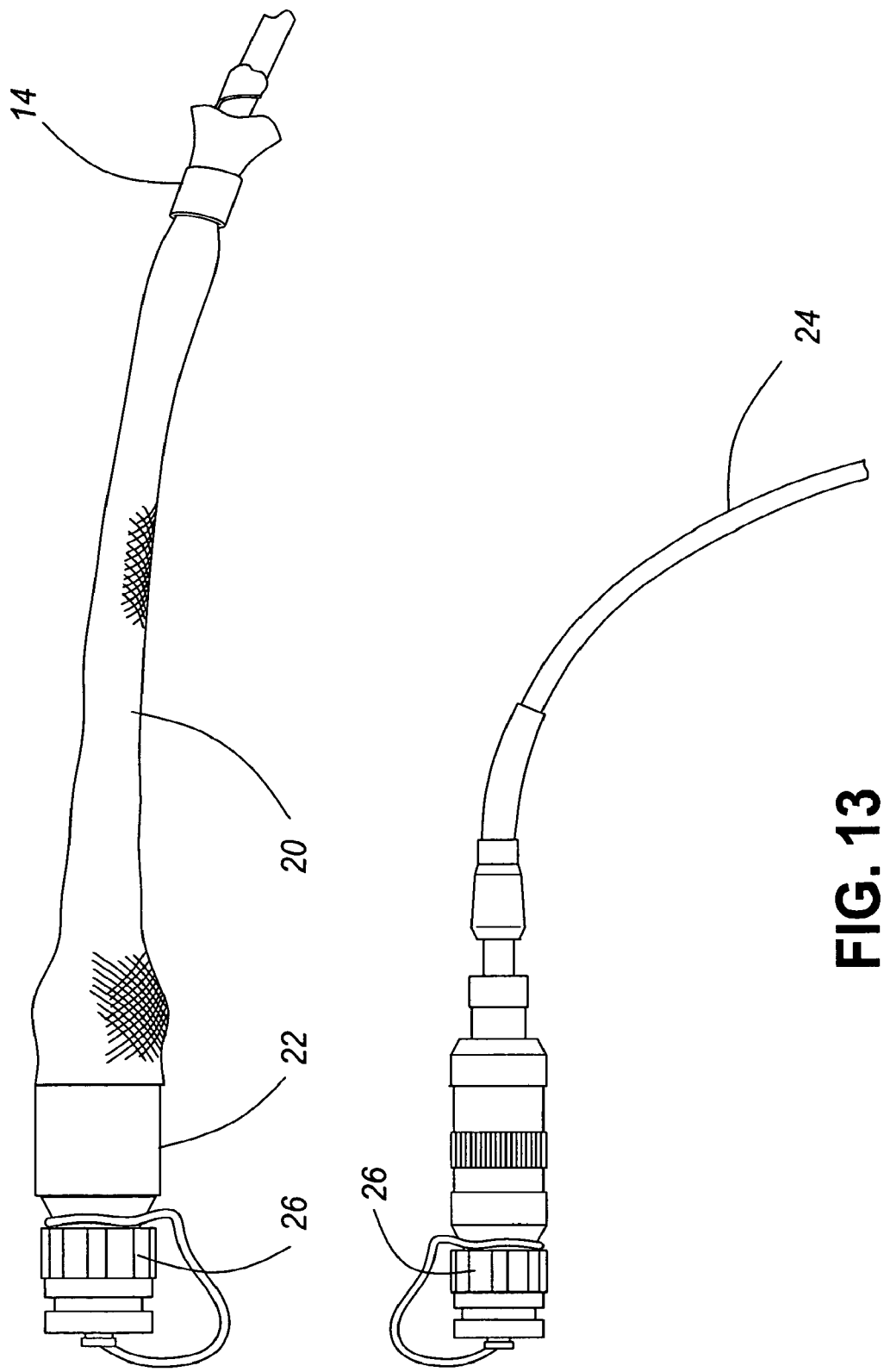
FIG. 13 presents a perspective view of the finished assembly, in an embodiment of the present invention, adjacent to a fibre optic cable/fibre optic cable connector assembly without the bend/stress relief of the invention.

The installation is now complete. FIG. 13 presents a perspective view of the finished assembly adjacent to a fibre optic cable/fibre optic cable connector assembly without the bend/stress relief of the invention.

The sleeve of the invention greatly adds to the cable strength and flexion resistance as well as adding greater tensile strength by bonding the cable jacket to the fibre optic cable connector 26 (or EO Module). The bend/stress relief sleeve of the invention provides at least the following advantages:

1) Can be added to existing cable assemblies with ease.
2) Provides positive bend radius control.
3) Extends cable tensile strength property through to the connector/EO modules, unlike conventional molded boots
4) Does not damage cable strength members.
5) Easy to use.
6) Remains flexible through a wide temperature range.
7) Provides a smooth interface between cable and connector to prevent snagging during retrieval.
8) Compensates for poor weight ratio of connector to fibre.

All citations and references to known materials, are hereby incorporated by reference.

The present invention has been described with regard to one or more embodiments. However, it will be apparent to persons skilled in the art that a number of variations and modifications can be made without departing from the scope of the invention as defined in the claims.

What is claimed is:

1. A bend/stress relief sleeve kit for installation over an existing fibre optic cable/fibre optic cable connector assembly without disassembly or modification of said existing fibre optic cable/fibre optic cable connector assembly, said kit comprising:
   an inner spiral wrap for wrapping said existing fibre optic cable/fibre optic cable connector assembly, overlapping at least part of said fibre optic cable connector and extending over said fibre optic cable, said spiral wrap providing bend relief;
   an outer mesh having a tubular passageway, for overlapping at least part of said fibre optic cable connector and extending over said fibre optic cable, said outer mesh covering at least a substantial portion of said inner spiral wrap;
   first fastening means for fastening said outer mesh to said fibre optic cable connector; and
   second fastening means for fastening said outer mesh to said fibre optic cable;
   whereby the combination of said outer mesh, said first fastening means and said second fastening means provides tensile strength to said existing fibre optic cable/fibre optic cable connector assembly; and
   whereby said outer mesh provides a smooth exterior surface to prevent snagging with outside obstructions.

2. The bend/stress relief sleeve of claim 1 wherein said outer mesh comprises a non-metallic mesh.

3. The bend/stress relief sleeve of claim 2 wherein said outer non-metallic mesh comprises a polymer.

4. The bend/stress relief sleeve of claim 2 wherein said outer non-metallic mesh comprises abrasive-resistant polyester mesh.

5. The bend/stress relief sleeve of claim 1 wherein said first fastening means comprises a heat shrink sleeve.

6. The bend/stress relief sleeve of claim 1 wherein said second fastening means comprises a first split crimp sleeve.

7. The bend/stress relief sleeve of claim 1 further comprising a second split crimp sleeve for crimping said spiral wrap to said fibre optic cable.

8. The bend/stress relief sleeve of claim 1 further comprising an outer spiral wrap, disposed between said inner spiral wrap and said outer mesh, said outer spiral wrap providing additional bend relief.

9. The bend/stress relief sleeve of claim 1 further comprising a third fastening means for fastening said inner spiral wrap to said fibre optic cable.

10. The bend/stress relief sleeve of claim 1 wherein said third fastening means comprises a second split crimp sleeve.

11. The bend/stress relief sleeve of claim 1 wherein said first and second crimp sleeves are arranged so that said first crimp will bear on said second crimp sleeve if tension is applied to said fibre optic cable connector.

12. The bend/stress relief sleeve of claim 1 wherein said first and second crimp sleeves are non-sparking metal crimp sleeves.

13. The bend/stress relief sleeve of claim 1 wherein all of said materials are made from materials which remain flexible over a temperature range of −70 C. to 100 C.

14. The bend/stress relief sleeve of claim 1 wherein all of said materials are made from fire-resistant materials.

15. A method of installing a bend/stress relief sleeve over an existing fibre optic cable/fibre optic cable connector assembly, without modifying or disassembling said existing fibre optic cable/fibre optic cable connector assembly, comprising the steps of:
   wrapping a length of an inner spiral wrap around said existing fibre optic cable/fibre optic cable connector assembly, overlapping at least part of said fibre optic cable connector and extending over said fibre optic cable, said spiral wrap providing bend relief;
   inserting said wrapped existing fibre optic cable/fibre optic cable connector assembly into an outer mesh having a tubular passageway, overlapping at least part of said fibre optic cable connector and extending over said fibre optic cable, said outer mesh covering at least a substantial portion of said inner spiral wrap;
   fastening said outer mesh to said fibre optic cable connector using a first fastening means; and
   fastening said outer mesh to said fibre optic cable using a second fastening means;
   whereby the combination of said outer mesh, said first fastening means and said second fastening means provides tensile strength to said existing fibre optic cable/fibre optic cable connector assembly; and
   whereby said outer mesh provides a smooth exterior surface to prevent snagging with outside obstructions.

16. The method of claim 15, wherein said step of inserting comprises the step of inserting said wrapped existing fibre optic cable/fibre optic cable connector assembly into an abrasive-resistant polyester mesh.

17. The method of claim 15 wherein said step of fastening said outer mesh to said fibre optic cable connector comprises the step of fastening said outer mesh to said fibre optic cable connector using a heat shrink sleeve.

18. The method of claim 15 wherein said step of fastening said outer mesh to said fibre optic cable using a second fastening means comprises the step of fastening said outer mesh to said fibre optic cable using a first split crimp sleeve.

19. The method of claim 15 further comprising the step of crimping said spiral wrap to said fibre optic cable using a second split crimp sleeve, where said first and second crimp sleeves are arranged so that said first crimp will bear on said second crimp sleeve if tension is applied to said fibre optic cable connector.

* * * * *